United States Patent [19]

Amano et al.

[11] 3,940,555

[45] Feb. 24, 1976

[54] PICTURE SIGNAL TRANSMISSION SYSTEM

[75] Inventors: Kitsutaro Amano, Yokohama; Hiroshi Sasaki, Nagareyama; Tatsuo Maruyama, Tokyo, all of Japan

[73] Assignee: Kokusai Denshin Denwa Kabushiki Kaisha, Japan

[22] Filed: Aug. 21, 1973

[21] Appl. No.: 390,187

[30] Foreign Application Priority Data

Aug. 23, 1972 Japan.................... 47-83630

[52] U.S. Cl............... 178/6; 325/38 B; 178/DIG. 3
[51] Int. Cl.²........................................ H04N 5/38
[58] Field of Search........... 178/DIG. 3, 6; 325/38 B

[56] References Cited
UNITED STATES PATENTS

| 3,571,505 | 3/1971 | Mounts | 178/6.8 |
|---|---|---|---|
| 3,720,786 | 3/1973 | Cutter | 178/7.1 |
| 3,769,451 | 10/1973 | Commor | 178/6 |
| 3,769,453 | 10/1973 | Bahl | 178/6 |
| 3,801,737 | 4/1974 | Komura et al. | 178/6 |

*Primary Examiner*—Howard W. Britton
*Assistant Examiner*—Edward L. Coles
*Attorney, Agent, or Firm*—Robert E. Burns; Emmanual J. Lobato; Bruce L. Adams

[57] ABSTRACT

A picture signal transmission system for transmitting after coding a picture signal obtained by scanning at least one picture to be transmitted, in which a difference between a representative level value of each picture element unit formed by at least one picture element and a forecast value obtained in accordance with a predetermined rule and based on a representative level value of adjacent ones of said picture element units is detected, and in which first level information and second level information are transmitted. The first level information indicates, for each picture element by a bit of binary information, whether or not the difference exceeds a predetermined threshold value for a group of picture elements corresponding to a predetermined area of the picture. The second level information indicates level information of particular picture elements on each of which said difference exceeds the threshold value.

7 Claims, 7 Drawing Figures

PICTURE SIGNAL TRANSMISSION SYSTEM

This invention relates to a picture signal transmission system, in which picture signals produced by scanning a television picture or a document are transmitted at high efficiency after coding.

In accordance with high development and complication of social and economic activities and with rapid progress of technology, attention is now being paid to picture transmission such as picturephony and facsimile telegraphy utilizing the sense of sight in addition to telephony based on the sense of hearing only. However, their picture signals usually have a very wide frequency band, so that the cost for transmission is very high and this is a cause of arresting the spread of the picture transmission service. To avoid this, many attempts have heretofore been made for the band compression by the utilization of statistical properties of the picture signal or visual characteristics of human eyes. The method utilizing the statistical properties of the picture signal makes use of the fact that the picture signal has a very close interrelationship between adjacent picture elements in the same picture or between picture elements at the same position of adjacent frames (both of these picture elements will hereinafter be referred to as "adjacent picture elements"). Many methods of this kind such as a forecast encoding method, an interpolation method, a method of utilizing the interrelationship between adjacent frames and so on are well known in the art. However, since almost all of these methods do not make effective use of the property of the picture signal, the band compression ratio is about one-half at the highest. For example, in a difference coding method belonging to the forecast coding method on which many studies have recently been made, each picture element is coded in three or four bits by coding the level difference (hereinafter referred to as "difference") between respective picture elements and the transmission band width is compressed into about one-half of that in a usual PCM coding method. However, even where the difference is below a minimum quantization level, that is, where substantially no level change exists, the difference is coded in the same number of bits as that for other differences. Theoretically, even if the difference information below the minimum quantization level is not transmitted, reproduction of an original picture at the receiving side is possible, so that it might be said that such difference coding method still transmits an appreciable amount of redundant information. This is a defect of the difference coding method and also in common to the other forecast coding method, the interpolation method and so on. Further, in a difference coding method for the band compression of usual television signals, the minimum quantization level is generally selected at a value corresponding to about 2 percent of the overall amplitude of the picture signal. Moreover, it is considered that such a value does not present any problem in picture quality. Regarding this, results obtained by practically measuring the distribution of the difference between the adjacent picture elements of various television pictures have been published (for example, in a publication (1): "Statistic Properties of Television Signal" by Suzuki et al., Television vol. 25, No. 8, 1971). This publication shows that those picture elements, whose absolute value of the difference exceeds the minimum quantization level, account for about 11 percent of all picture elements on an average and that effective use of the difference distribution characteristic would enable further band compression.

On the other hand, a band compression system of the type utilizing the above difference distribution characteristic has been proposed such that, in television signal transmission, information of only those picture elements whose differences between frames exceed a certain level are transmitted (for example, in a publication (2): "Transmitting Television as Clusters of Frame-to-Frame Differences", by J. C. Candy et al., The Bell System Technical Journal, vol. 50, No. 6, Aug. 1971). This system has such defects that a considerable number of transmission bits are required for the transmission of position information of those picture elements whose differences exceed a certain level and that the picture quality is greatly deteriorated in the case of speedily moving pictures.

Many methods of the type utilizing the visual characteristic of human eyes have been proposed in addition to those utilizing the statistic properties of the picture signal but any of them does not provide the satisfactory band compression.

An object of this invention is to provide a system for transmitting a picture signal after coding, which is based on the aforesaid difference distribution characteristic of the picture signal, and in which level information of only these picture elements whose differences against adjacent picture elements or errors of the respective picture elements against the respectively forecast values exceed a predetermined level is transmitted, thereby providing a picture of higher efficiency and quality than those obtainable by the prior art systems.

The principle, construction and operations of this invention will be clearly understood from the following detailed description taken in conjunction with the accompanying drawings, in which.

Figure 1:
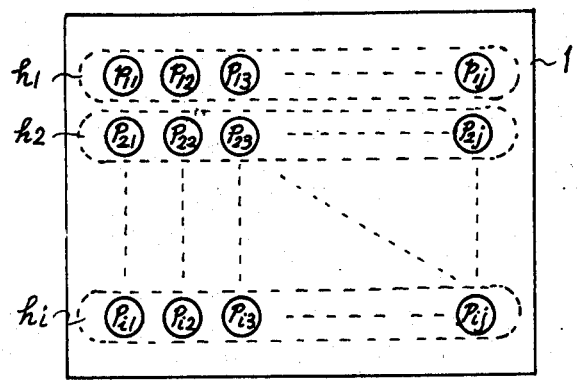
FIG. 1 is a schematic diagram illustrating an example of a picture formed by a plurality of divided groups of picture elements in this invention.

A description will be given first with regard to the principle of this invention. In order that only the level information of those picture elements (hereinafter referred to an "changed picture elements") whose differences against adjacent picture elements or errors of the respective picture elements against the respective forecast values exceed a predetermined value may be transmitted and that an original picture may be reproduced at the receiving side in response to the transmitted level information, information indicating the position of each changed picture element in the picture is generally required. For this purpose, it is possible to use a method employing address information, which is obtained by directly coding the positional coordinates of the changed picture elements. However, since this method requires a lot of transmission bits for the positional information, a great amount of band compression cannot be expected. By the way, even a certain group of picture elements of the sufficiently large number appropriately selected from those of a picture can provide substantially the same difference distribution characteristic as the aforementioned one and, from the measured results given in the aforesaid publication (1), it might be said that the number of the changed picture elements in this group is smaller than about $0.2\, n_0$ on an average. In view of this, the present invention employs a principle, in which all the picture elements of one picture are divided into groups each including $n_0$'s picture elements in accordance with a predetermined rule, in which a channel for transmitting change information indicating the presence and absence of a change in each picture element and a channel for transmitting level information of ($n_1 = \alpha \cdot n_0$)'s changed picture elements are provided respectively for each group of the picture elements, and in which only information of the changed picture elements is transmitted through these channels for each picture element group. In this case, a notation $\alpha$ is a coefficient dependent upon the difference distribution characteristic of each picture element of the picture element groups and $\alpha$ is selected to be about 0.2 to 0.3 to leave a margin. For example, all the picture elements of one picture are divided into groups, each comprising the picture elements aligned in a horizontal direction (the number of the picture elements $n_0 = 100$). Moreover, the change information that whether each picture element is a changed one or not is indicated by binary information 1 or 0 (in this case, $n_0 = 100$ bits in all) and the level information of ($n_1 = 20$)'s changed picture elements (assuming that $\alpha = 0.2$) are transmitted for each picture element group. In this system, since the positional indication of the changed picture elements is achieved by the use of the change information of one bit per each picture element (this bit rate can be decreased as will be described hereinafter), a great amount of band compression can be obtained in view of the transmission of only the level information of the changed picture elements. Namely, in the case of transmitting one picture element group, if the level information is coded in four bits according to the conventional difference coding method ($4n_0 = 400$)'s bits are required. However, the system of this invention requires only ($n_0 + 4n_1 = 180$)'s bits, so that the required transmission band width can be further reduced to below one-half of that obtainable by the difference coding method.

Figure 2:
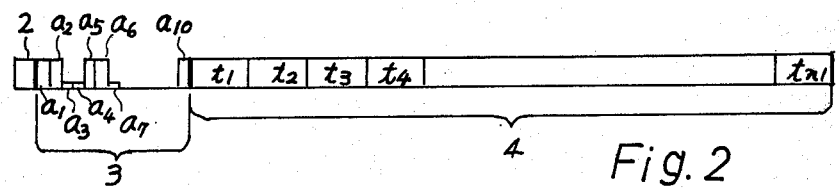
FIG. 2 is a diagram illustrating an example of a transmission code unit in this invention.

The present invention will hereinafter be described in detail in connection with some examples thereof. FIG. 1 shows an example of a principle that the picture elements of one picture are divided into a plurality of groups. In FIG. 1, reference characters P11, P12, ... P1j, P21, P22, ... P2j, ... Pi1, Pi2, ... Pij surrounded by circles represent picture elements respectively. In the present example, the picture 1 is divided into $i$'s picture element groups $h_1, h_2, \ldots h_i$, each including $j$'s picture elements aligned on each horizontal scanning line. In each picture element group, each picture element and that on its left-hand side (for example, in the picture element group $h_1$, the picture elements $P_{11}$ and $P_{12}$; $P_{12}$ and $P_{13}$; ...; $P_{1-j}$ and $P_{1j}$) are sequentially compared with each other to obtain the differences there between, and only picture information of the changed picture elements is transmitted. FIG. 2 illustrates an example of the transmission code configuration in this case. FIG. 2 shows an example of the configuration of transmission code groups (hereinafter referred to "code units") each corresponding to each picture element group. In the code units, a reference numeral 2 designates a unit synchronizing code indicating the start of the code unit, 3 a change information group including change information indicating the presence or absence of a change in each picture element of the picture element groups, and 4 a level information group indicating the levels of only those picture elements which have been indicated as changed picture elements in the change information group 3. The change information group 3 is composed of $N_0$ bits of information $a_1, a_2, \ldots a_{n_0}$ which indicate by 1 and 0 the presence and absence of a change in each picture element P of $n_0$'s ($n_0 = j$ in FIG. 1) picture elements making up the picture element groups. The example of FIG. 2 shows that 1st, 2nd, 5th, 6th, ... $n_0(=j)$th picture elements (in the case of, for example, the picture element group $h_1$, the picture elements $P_{11}, P_{12}, P_{15}, P_{16}, \ldots P_{1j}$) are the changed picture elements. Since the left-hand end picture element of each group, for example $P_{11}$, has no mating picture element for comparison therewith, its level is compared with a predetermined level. On the other hand, the level information group 4 is composed of ($n_1 = \alpha_1 \cdot n_0$)'s time slots $t_1, t_2, \ldots t_{n_1}$ for inserting the level information of only the changed picture elements ($\alpha_1$ will be described later on.) and only the level information of the picture elements indicated as the changed picture elements in the change information group 3 is successively inserted from $t_1$. In the above example, the level information of the picture elements $P_{11}, P_{12}, P_{15}, P_{16}, \ldots P_{1j}$ is successively inserted into the time slots $t_1, t_2, t_3, t_4, \ldots$ and transmitted. In this case, the level information of the changed picture element $P_{1j}$ is not always inserted into the time slot $t_{n_1}$.

The constant $\alpha_1$ is a constant which is dependent on the distribution characteristic of the difference of each picture element of the groups $h_1, h_2, \ldots h_i$ shown in FIG. 1, and it is selected so that the probability of the number of changed picture elements in one picture element group exceeding $n_1 = \alpha_1 \cdot n_0 = \alpha_1 j$ may be sufficiently low. From the view point of band compression, it is desired to minimize the constant $\alpha_1$. However, if the constant $\alpha_1$ is too small, the number of the changed picture elements exceeds $n_1$, which often introduces the possibility that some of the changed picture elements cannot be transmitted (which will hereinafter be referred to as "shutout"), resulting in the deterioration of picture quality. To avoid this, the constant $\alpha_1$ is selected at an appropriate value of the relationship between the difference distribution characteristic and an allowable shutout ratio. Accordingly, if the number of the changed picture elements in one picture element group is smaller than $n_1$, the last time slots become blank. In this case, it is also possible to regard an appropriate number of non-changed picture elements as changed ones, insert their level information into the blank time slots and transmit $n_1$'s level information in all.

Figure 3:
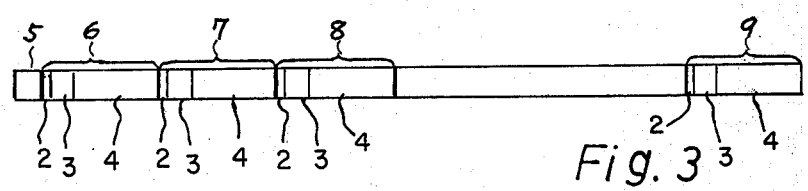
FIG. 3 is a diagram illustrating an example of a transmission signal train formed by the transmission code units shown in FIG. 2.

FIG. 3 shows an example of the configuration of a transmission signal which is formed by an assembly of such code units as shown in FIG. 2 and transmits picture information of the entire area of the picture. In FIG. 3, a reference numeral 5 designates a start code showing the start of the picture, and 6, 7, 8, . . . 9 $i$'s code units each corresponding to each of picture element groups ($h_1, h_2, h_3, \ldots h_i$ in the example shown in FIG. 1). With this signal configuration, picture information on the changed picture elements of the picture element groups $h_1, h_2, h_3, \ldots h_i$ in a picture is transmitted in the form of the code units 6, 7, 8, . . . 9.

The foregoing has described for the principle of transmitting one picture and, in the case of continuously transmitting a plurality of pictures as in television transmission, the operations described above with reference to FIGS. 1, 2 and 3 are achieved for each picture (for example, one field, one frame) to obtain a continuous signal of the code system of FIG. 3, which is then transmitted.

Figure 4:
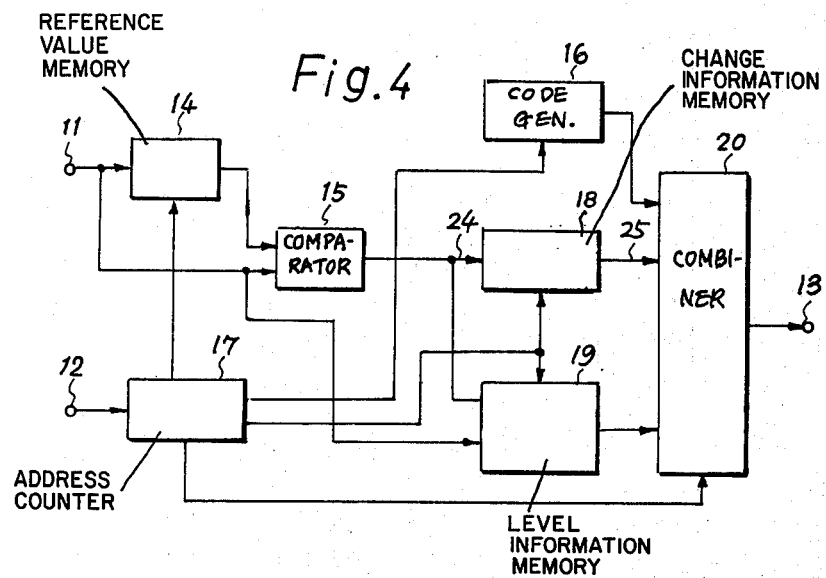
FIG. 4 is a clock diagram illustrating an embodiment of the sending side of this invention.

The following will describe for the construction of the picture information transmitting system of this invention described above. FIG. 4 illustrates one example of a transmission unit, in which a reference numeral 11 indicates an input terminal for picture signal, that is, a train of level information of picture elements which is produced by scanning a picture; 12 an input terminal for a start timing signal indicating the instant of starting the scanning of a picture; 13 an input terminal for a series of transmission codes converted by this apparatus; 14 a reference value memory for storing level information of a picture element previously scanned (which is the picture element on the left of each picture element in the example of FIG. 1 and which will hereinafter be referred to as "a preceding picture element"); 15 a comparator for comparing the level information of each picture element applied to the input terminal 11 (which information will hereinafter referred to as "level information of an input picture element") with that of an immediately preceding picture element; 16 a code generator for generating patterns predetermined as the starting code 5 and the unit synchronizing code 2 respectively; 17 a picture element-address counter for indicating the position of the input picture element in the picture; 18 a transmission change information memory for storing change information of each picture element; 19 a transmission level information memory for storing level information of only the changed picture element; and 20 a transmission combiner, by which output signals from the change information memory 18 and the level information memory 19 are arranged in terms of time into such a transmission signal train as shown in FIG. 3.

The operations of this apparatus will hereinabelow be described. It is assumed that the picture is scanned in a horizontal direction, that is, in the example of FIG. 1, the picture is scanned in the order of the picture elements $P_{11}, P_{12}, \ldots P_{1j}, P_{21}, \ldots P_{2j}, \ldots P_{il}, \ldots P_{ij}$ and that a PCM signal representing the level value of each picture element in the form of a digital code is applied to the input terminal 11. In this case, the level value of each picture element is compared with the picture element scanned immediately before it, so that the reference value memory 14 serves as a memory for one picture element. The level information of the picture element in the input picture PCM signal applied to the terminal 11 is temporarily stored in the reference value memory 14. On the other hand, the input signal is fed to the comparator 14, in which the level information of the input picture element and the level information of the immediately preceding picture element (i.e., the left picture element on the picture) fed from the reference value memory 14 are compared with each other, thus judging whether or not the level difference therebetween exceeds a predetermined value, that is, whether or not the input picture element is a changed picture element. However, when the level information of the picture elements on the left-hand end ($P_{11}, P_{21}, \ldots P_{il}$ in the example of FIG. 1) is supplied to the input terminal 11, predetermined level information is previously stored in the reference value memory 14 so that the former level information is compared with the latter one to judge whether or not the picture elements are the changed one. Dependent upon whether the picture element is a changed one, binary information 1 to 0 is stored in response to a changed picture element or an unchanged picture element respectively through a lead 24 at a corresponding position in the transmission change information memory 18 having a memory capacity for one picture element group. At the same time, in the case of a changed picture element, its level information is stored in the transmission level information memory 19 having a memory capacity for $n_1$'s picture elements. At each time such processing of all the picture elements on one horizontal line is completed, the code unit shown in FIG. 2 is constructed by the transmission combiner 20 and derived from the terminal 13. At first, in accordance with the signal configuration shown in FIG. 3, the transmission combiner 20 reads out the start code 5 from the code generator 16 based on a timing signal derived from the picture element address counter 17, and provides it at the terminal 13. Then, after completion of the processing of the first picture element group $hd_1$, the unit synchronizing code 2 is read out from the code generator 16 based on the timing signal from the picture element address counter 17 and the change information and the level information of the changed picture elements are sequentially read out from the change information memory 18 and the level information memory 19 respectively at the terminal 13. Accordingly, the code unit 6 is sent out from the terminal 13. In a like manner, upon completion of the processing of each of the picture element groups $h_2, h_3, \ldots h_i$, the code units 7, 8, . . . 9 are sequentially derived from the terminal 13, thus sending out the signal train of such configuration as depicted in FIG. 3.

The transmission change information memory 18 is formed by two sets of serial memories having a bit capacity equal to the number of the picture elements $n_0$ ($=j$) of one picture element group, and they are alternately switched for writing or reading every processing of each of the picture element groups ($h_1, h_2, \ldots h_i$). Namely, in the case of processing the picture element group $h_1$, the one memory $M_1$ is used for writing the processing result and then, in the case of processing the picture element group $h_2$, the other memory $M_2$ is switched for writing and, at the same time, the memory $M_1$ is switched for reading to read out the change information of the picture element group $h_1$ previously written. On the other hand, the transmission level information memory 19 is formed by two sets of serial memories, which are capable of storing the level information of ($n_1 = \alpha_1 . n_0$)'s picture elements and are alternately switched every picture element group, as is the case with the above-mentioned change information memory 18.

The picture element address counter 17 is a counter, which makes a clear start upon application of a start timing signal through the terminal 12 and advances step by step at every arrival of the picture element information at the terminal 11, and which is used for indicating the position of each input picture element in the picture. Further, this counter 17 serves as a timing control circuit for the aforesaid circuits.

Figure 5:
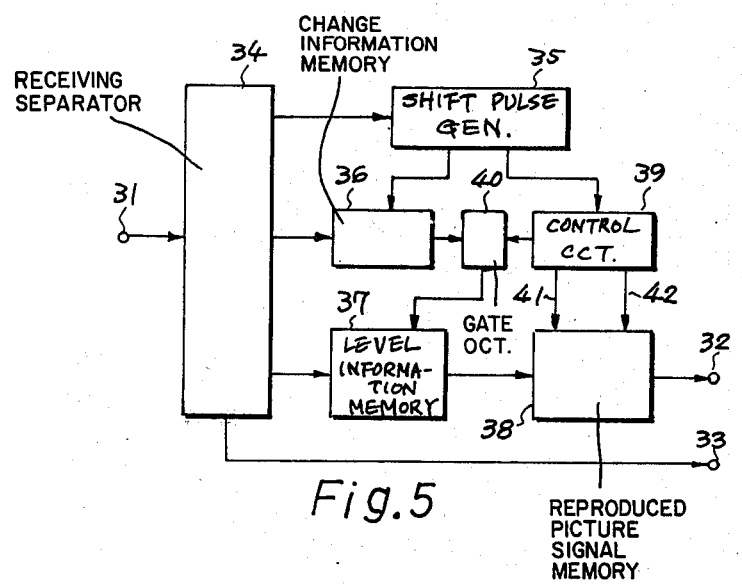
FIG. 5 is a block diagram illustrating an embodiment of the receiving side of this invention.

Next, an example of the construction of a receiving apparatus is shown in FIG. 5. In FIG. 5, a reference numeral 31 indicates an input terminal for a received signal train; 32 an output terminal for a reproduced picture PCM signal; 33 an output terminal for a start timing signal representing the instant of scanning start of one picture; 34 a receiving separator; 35 a shift pulse generator; 36 a receiving change information memory; 37 a receiving level information memory; 38 a reproduced picture signal memory; 39 a write and read control circuit; and 40 a gate circuit.

The received signal train of the configuration shown in FIG. 3 is applied to the terminal 31 and fed to the receiving separator 34 to detect the start code 5 having a predetermined pattern, which is derived from the start timing signal output terminal 33 at a certain time after the detection timing. Then, at every reception of each code unit, the receiving separator 34 detects first the unit synchronizing code 2 and then separates the change information 3 and the level information 4 received at a certain time after the detection timing in accordance with the configuration of the code unit of FIG. 2 to write them in the receiving change information memory 36 and the receiving level information memory 37 respectively. The operation of the receiving separator 34 is usually similar to the operation for the detection of a frame synchronizing code and channel separation based on the detection timing in a time-divisional multiplex transmission system, so that the techique employed in the latter can be applied. After all the information of one code unit has thus been received and stored, an original picture is reproduced from the received and stored change information and level information under the control of the control circuit 39, and the gate circuit 40 and the reproduced original picture is stored in the reproduced picture signal memory 38. Namely, in the case where a certain picture element is a changed picture element, the received level information stored in the receiving level information memory 37 is read out and writing in the reproduced picture signal memory 38 at a position corresponding to the picture element. On the other hand, in the case of an unchanged picture element, the same level information as the preceding picture element (i.e.; the picture element on the left of each picture element in the picture) is written in the reproduced picture signal memory 38 at a position corresponding to the picture element. Such processing of all the information of one code unit implies the reproduction of the level information of all the picture elements of one picture element group (in the example of FIG. 1, all the picture elements on one horizontal scanning line), and the reproduced level information is read out in a certain sequential order and sent out from the terminal 32.

The receiving change information memory 36 and the receiving level information memory 37 are respectively constructed as is the case of the transmission change information memory 18 and the transmission level information memory 19 of FIG. 4. Further, the reproduced picture signal memory 38 is provided with two sets of serial memories each having a capacity capable of storing the level information of all the picture elements (i.e.; $n_0$'s picture elements) of one picture element group, and these memories are alternately switched for writing and reading.

Next, the aforesaid original picture reproducing process will be described more in detail. The shift pulse generator 35 starts at the detection timing of the unit synchronizing code 2 supplied from the receiving separator circuit 34 and produces $n_0$'s shift pulses at predetermined intervals $T_1$, which are applied to the receiving change information memory 36 and the control circuit 39. At every application of the shift pulse, the receiving change information memory 36 reads out the change information of the picture elements in the order of $a_1, a_2, \ldots a_{n0}$ and supplies them to the gate circuit 40. On the othe hand, the control circuit 39 produces a pulse at a certain time $T_2$ after each of the anove-mentioned shift pulses and applies it to the gate circuit 40. Consequently, if the change information is 1, that is, if the corresponding picture element is a changed one, the output pulse from the control circuit 39 is applied through the gate circuit 40 to the receiving level information memory 37, by which level information of the changed picture element is read out from the memory 37 and applied to the reproduced picture signal memory 38. On the other hand, if the change information is 0, that is, in the case of an unchanged picture element, the gate circuit 40 is closed, so that new level information is not read out from the reproduced level information memory 37, and the level information read out previously remains unchanged at the output end of the memory 37 and applied as the level information of the unchanged picture element to the reproduced picture signal memory 38. The level information thus read out from the receiving level information memory 37 is sequentially stored in the reproduced picture signal memory 38 by a write pulse fed through a lead 41 from the control circuit 39 (which pulse is generated at the time $T_3$ after the aforementioned shift pulse, where $T_2$ $T_3$ $T_1$), thus reproducing the original picture in the reproduced picture signal memory 38.

The reception of the code unit of the picture element group $h_1$ in the examples of FIGS. 1 and 2 will hereinbelow be described. With a first shift pulse, the change information $a_1 = 1$ of the picture element $P_{11}$ is read out from the change information memory 36 and applied to the gate circuit 40, so that a read pulse is applied to the level information memory 37 and the level information transmitted at the time slot $t_1$ in FIG. 2 is written as the level information of the first picture element $P_{11}$ in the reproduced picture signal memory 38. In a similar manner, since the change information of the picture element $P_{12}$ is $a_2 = 1$, the level information in the time slot $t_2$ is written as the level information of the second picture element $P_{12}$ in the reproduced picture signal memory 38. However, since the change information of the picture element $P_{13}$ is $a_3 = 0$, the level information of the preceding picture element $P_{12}$ (i.e.; the information in the time slot $t_2$) is written as the level information of the third picture element $P_{13}$ in the reproduced picture signal memory 38. All the picture signals of the picture element group $h_1$ are reproduced by processing the signals of one code unit as described above, so that they are read out by a read pulse applied through a lead 42 and derived from the output terminal 32.

In the foregoing, the receiving change information memory 36, the received level information memory 37 and the reproduced picture signal memory 38 have been described to be serial memories, but they may be random-access type memories, in which case the shift pulse generator 35 should be replaced by an address counter for indicating the write address of these memories.

In the example of this invention described above, the unit synchronizing code 2 is inserted at the start of each code unit, but since the length of the code unit is predetermined, the start position of each code unit can be known from the position of the start code 5 on the receiving side, and consequently the unit synchronizing code 2 is not indispensable to this invention.

In the foregoing example, two picture elements on the same horizontal scanning line, that is, two adjacent picture elements in the same picture element group are compared with each other, but it is also possible to adopt the principle of comparing two picture elements on two adjacent horizontal scanning lines with each other, for example, $P_{11}$ and $P_{21}$, $P_{12}$ and $P_{22}$, ... $P_{1i}$ and $P_{2j}$. With respect to the picture information of each picture element group in this case, the change information of each picture element and the level information of the changed picture element obtained by such comparison of two picture elements as mentioned above are arranged in the form of such a code unit as shown in FIG. 2 and transmitted in such a form of transmission signal train as shown in FIG. 3. However, since the picture elements $P_{11}$, $P_{12}$, ... $P_{1i}$ of the first picture element group $h_1$ have no picture elements for the comparison therewith, use is made of the principle of detecting the difference between the level of each of these picture elements and a predetermined level or transmitting the level information of all the picture elements only in connection with this picture element group. From the constructional point of view, apparatus for this purpose is substantially the same as that described previously with regard to FIGS. 4 and 5 except the following points. Namely, a transmitting apparatus is different from that (FIG. 4), in which the comparator 15 is required to have a level information memory capacity for all the picture elements on one horizontal scanning line for comparing picture elements with those on the preceding horizontal scanning line, and receiving apparatus is different from the aforementioned one in which when the original picture signal is reproduced in the reproduced picture signal memory 38, the level information of the picture element on the preceding horizontal scanning line (i.e.; the picture element immediately above in the picture) is employed as the level information of the unchanged picture element.

Figure 6:
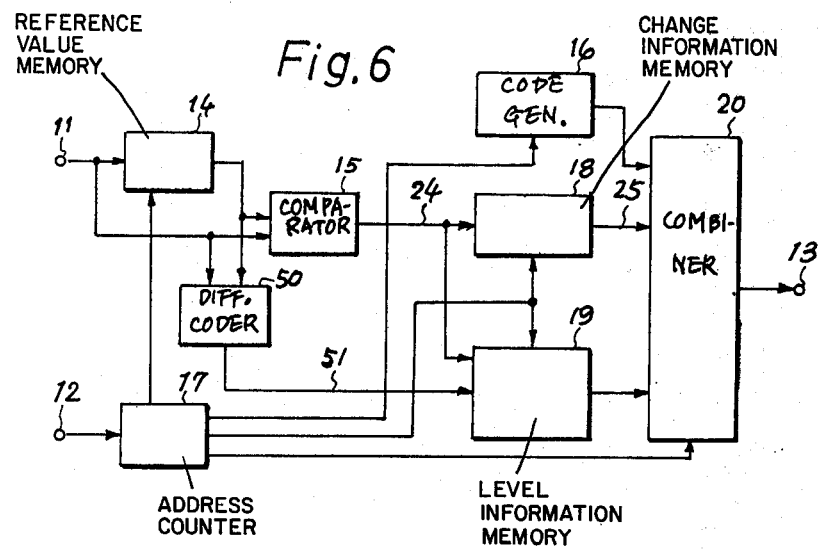
FIGS. 6 and 7 are block diagrams each illustrating another example of the sending side of this invention.

The foregoing has described the principle of this invention in connection with its concrete examples, but further various modifications can be considered. One of them is a system of transmitting difference information of the changed picture element instead of transmitting the level information itself of the varying picture element as in the foregoing example, by which the number of coded bits can be reduced by one half. FIG. 6 shows one example of a transmitting apparatus therefore. This apparatus is identical in construction with that shown in FIG. 4 except that a difference coder 50 is provided, by which the difference between the changed picture element and the immediately preceding picture element is coded and stored in the level information memory 19 through a lead 51. This requires receiving apparatus to have a converter circuit for obtaining the original level information from the difference information, but this circuit can be easily constructed by applying a known difference coded signal decoder as it is.

Figure 7:
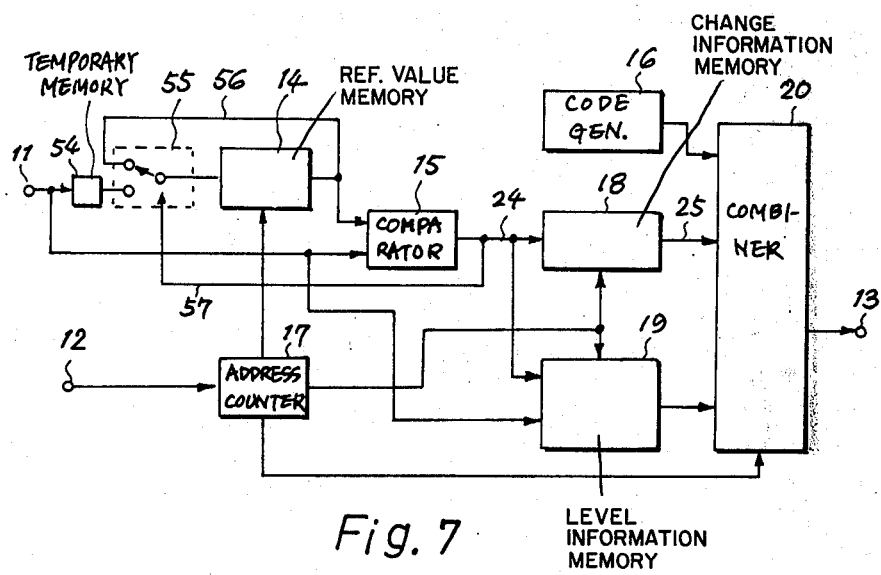

Another system is to construct the input section of the reference value memory 14 (FIG. 4) as shown in FIG. 7, in which the reference value for the difference is not limited specifically to the level information of the left-hand picture element but based on the level information of a varying picture element transmitted prior thereto. In FIG. 7, a reference numeral 54 indicates a temporary memory for storing the level information of one picture element; and 55 a switch which is switched by the change information of each picture element applied through a lead 57 from the comparator 15. When the input picture element is a changed one, the switch 55 is turned down to the side of the temporary memory 54, and the input picture element information is stored in the reference value memory 14. However, in the case where the input picture element is an unchanged one or a changed one which has not been transmitted in practice by the shutout, the switch 55 is turned down to a lead 56, by which the picture element information stored in the reference value memory 14 is rewritten in the reference value memory 14. As a result of this, the level information of the picture element practically transmitted is stored as a reference value in the reference value memory 14.

In the above-described system (FIG. 4) if the picture is such that the difference between two adjacent picture elements is below the threshold value for judging the changed picture element and gradually changes, it can not be transmitted with accuracy. However, in this system, the difference between the picture element and the preceding one practically transmitted is used, so that when this difference exceeds the above-mentioned threshold value the level information is always transmitted, and consequently such a gentle level change as mentioned above can also be transmitted with accuracy.

Figure 8:
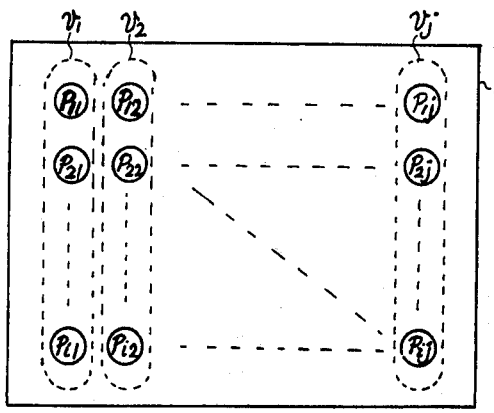
FIGS. 8, 9 and 10A, 10B and 10C are diagrams each illustrating another example of a picture formed by different groups of picture elements.

Further, the principle of dividing the picture elements of the picture into the picture element groups can also be considered variously other than that described previously in connection with FIG. 1. FIG. 8 shows one example in which the picture elements arranged in a vertical direction are divided into $j$'s picture element groups: $v_1 = P_{11}, P_{21}, \ldots P_{i1}, v_2 = P_{12}, P_{22}, \ldots P_{i2}, \ldots v_j = P_{1j}, P_{2j}, \ldots P_{ij}$. In this case, respective picture elements and those immediately above them in the picture, for example, ($P_{11}$ and $P_{21}$), ($P_{21}$ and $P_{31}$), ... ($P_{i-1}$ and $P_{i1}$), are compared with each other or the respective picture elements and those on their left, for example, ($P_{11}$ and $P_{12}$), ($P_{21}$ and $P_{22}$), ... ($P_{i1}$ and $P_{i2}$), are compared with each other to construct only the picture information of the changed picture elements with the code unit of FIG. 2 for every picture element, which is transmitted in the form of the code train of FIG. 3. In this system, the picture is subjected to horizontal canning in the order of $P_{11}, P_{12}, \ldots P_{21}, \ldots P_{2j}, \ldots P_{i1}, \ldots P_{ij}$, so that transmission becomes possible only when all the code units have been produced after the processing of the entire area of the picture. Consequently, from the viewpoint of the apparatus construction, each of the transmission change information memory 18, the transmission level information memory 19 (FIG. 4), the receiving change information memory 36, the receiving level information memory 37 and the reproduced picture signal memory 38 (FIG. 5) is required to have a memory capacity corresponding to one picture.

Figure 9:
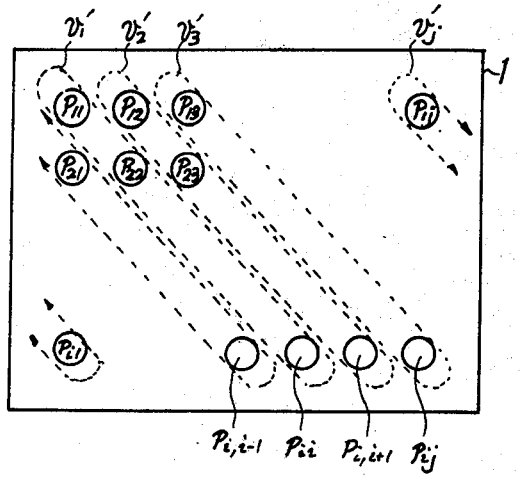

Further, a modification of the principle of FIG. 8 may also be considered to be such as shown in FIG. 9, in which picture elements arranged aslant are assembled into picture element groups, that is, the picture elements are divided into picture element groups $v'_1 = P_{11}$, $P_{22}, \ldots P_{ii}$, $v'_2 = P_{12}, P_{23}, \ldots P_i, P_i + 1, \ldots, v'_j = P_{1j}$, $P_{21}, \ldots P_i, P_{i-1}$, respectively. Since the difference characteristic has usually a statistic deviation according to the position in the picture, that is, such a deviation that, for example, the change is little in the peripheral area of the picture and much in the central area thereof, the above principle is intended to make the difference characteristics of the respective picture element groups by dispersing the picture elements of the respective picture element groups over the entire area of the picture. In accordance with an extension of this concept, if the picture elements on each horizontal scanning line are selected as at random as possible in accordance with a predetermined rule, more effective band compression can be expected. This is advantageous in the point of the picture quality, since the influence of a bit error of a transmission line is dispersed in the picture.

Figure 10A:
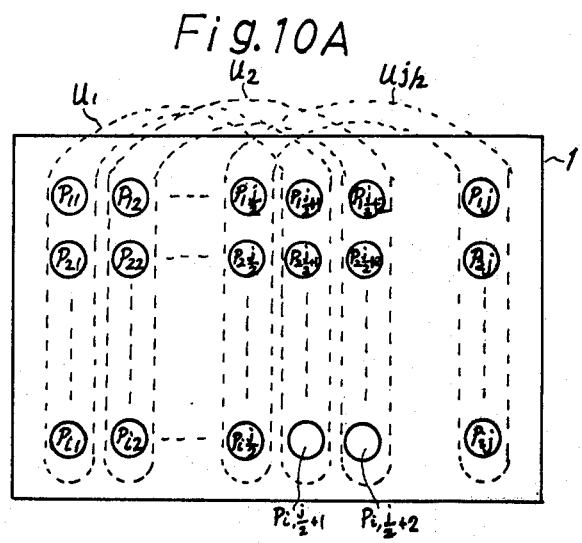
Figure 10B:
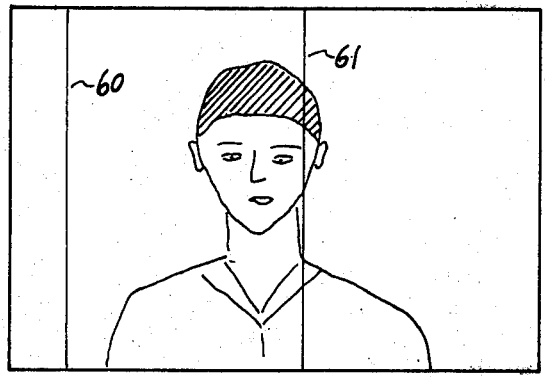
Figure 10C:
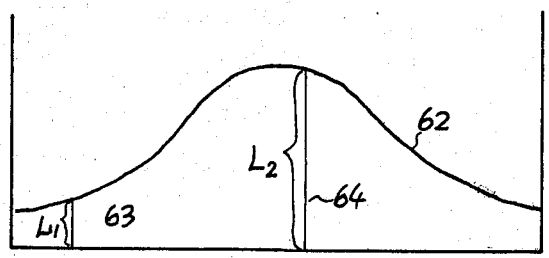

In view of such properties of the picture in that changed picture elements are usually few in the peripheral area of the picture but many in the central area there of, it is also possible to employ the principle of forming each picture element group by picture elements spaced apart from each other in the picture. For example, as shown in FIG. 10a, by constructing $(j/2)$'s picture element groups: $U_1 = P_{11}, P_{21}, \ldots, P_{i1}, P_1, j/2 + 1, P_{2j}/2 + 1, \ldots P_i, j/2 + 1, U_2 = P_{12}, P_{22}, \ldots, P_{i2}, P_1, j/2 + 2, P_{2j}/2 + 2, \ldots, P_i, j/2 + 2, \ldots, U_j/2 = P_1, j/2, P_{2j}/2, \ldots, P_i, j/2, P_{1j}, P_{2j}, \ldots P_{ij}$ only with those picture elements which are spaced apart from each other by one-half of the width of the picture, maldistribution of the changed picture elements can be averaged, so that more band compression can be expected. This is of particular utility when employed in the case of picturephone signals of such a picture as shown in FIG. 10B. In this case, the distribution of the number of changed picture elements is such that the changed picture elements are many in the central area and few on both peripheral areas on an average, as indicated by a curve 62 in FIG. 10C. Consequently, the numbers of the changed picture elements on vertical lines 60 and 61 corresponding to the picture element group $U_1$ are $L_1$ and $L_2$ expressed by the lengths of segments 63 and 64 in FIG. 10C respectively. For the transmission of the picture information of the picture element group $U_1$, it is sufficient only to prepare a transmission capacity of $(L_1 + L_2)$'s changed picture element information (corresponding to the number of the time slots in the level information group 4 in FIG. 2). However, in the case of transmitting this picture element group $U_1$ by the principle of FIG. 8, group $U_1$ is divided into two picture element groups $V_1$ and $V_{j/2}$, and they are transmitted in the form of different code units. In this case, a capacity capable of transmitting the information of at least $L_2$'s changed picture elements with respect to each of the groups $V_1$ and $V_{j/2}$ is required, so that a transmission capacity of $2L_2$'s changed picture elements for the transmission of picture information of the two picture element groups $V_1$ and $V_{j/2}$, from which it appears that the principle of FIG. 10A is advantageous as compared with that of FIG. 8, since the required capacity is less than that in the latter by a value $(L_2 - L_1)$. This effect results from averaging the number of the changed picture elements of each picture element group by combining an area containing many changed picture elements (for example, the picture element group $V_{j/2}$) with an area containing few changed picture elements (for example, $V_1$) into one picture element group (for example, $U_1$).

It is also possible to employ the principle of constructing one picture element group with picture elements on two or more spaced horizontal scanning lines, in addition to the principle of the example of FIG. 10A.

In the case of a television signal, it is also possible to employ the principle of constructing each picture element group by all the picture elements of one frame of the television signal. In this case, the picture element groups are constructed such that all the picture elements ($n_0 = i, j$) of a first frame make up a first picture element group and that all the picture elements of a second frame make up a second picture element group. Those picture elements of a certain picture element group and that immediately prior thereto (an immediately preceding frame) which are at the same position in the picture, for example, the picture elements $P_{11}$, those $P_{12}, \ldots$ are compared with each other to detect the difference therebetween, which is transmitted in the form of such a code unit as shown in FIG. 2 which consists of the change information $a_1, a_2, \ldots a_{n0}$ of ($n_0 = i.j$)'s bits and the level information $t_1, t_2, \ldots t_{n1}$ of ($n_1 = \alpha_1.i.j$)'s changed picture elements. In this case, since $n_0$ is large, the statistically averaging effect of the difference characteristic can be hightened and the constant $\alpha_2$ can be reduced as compared with the constance $\alpha_1$ mentioned previously. At the view point of apparatus, the transmitting section (see FIG. 4) is required to employ a memory having a level information memory capacity of ($n_0 = i.j$)'s picture elements of one frame as the reference value memory 14, two sets of memories having a memory capacity of $n_0$'s bits as the transmission change information memory 18 and two sets of memories having a level information memory capacity of $n_1$'s picture elements as the transmission level information memory 19, respectively. Further, the receiving section (see FIG. 6) is required to employ two sets of memories having a level information memory capacity of $n_0$'s picture elements as the reproduced picture signal memory 34. In this principle, the required amount of memory increases, but since the changed picture element ratio $\alpha_2$ can be reduced as mentioned previously, greater band compression can be expected to provide for enhanced the tranmission performance. This principle is of particular utility when employed for the transmission of stationary pictures.

In the foregoing examples, the change information bit is one for each picture element but this can be further reduced. Namely, the levels of adjacent picture elements usually undergo a similar change on account of the property of the picture, one change information bit is allotted to a picture element unit including $m$'s adjacent picture elements ($m$ being an integer greater than two), by which the change information bit is reduced down to $1/m$ in the foregoing examples. This will be described with regard to the example of FIG. 1. For example, each of pairs of two adjacent picture elements ($P_{11}$ and $p_{12}$), ($P_{13}$ and $P_{14}$) is regarded as one unit, and one change information bit is allotted to each unit. Moreover, if either one of the two picture elements is a changed picture element, a change is indicated by the change information bit. In the case of reception by the receiving apparatus, the two picture elements of each unit are both regarded as changed picture elements, and they are subjected to such processing as described previously to reproduce the original picture. Another principle for indicating the change is to indicate the picture element unit as a changed one only when its two picture elements are both changed ones. In this principle, the picture, quality is a little inferior to that obtainable with the anove example, but transmission efficiency is improved. In accordance with another principle, the sum (or a mean value) of two picture elements of each of the pairs of the picture elements ($P_{11}$ and $P_{12}$), ($P_{13}$ and $P_{14}$), ... is obtained; the difference in the aforementioned sum (or mean value) between two adjacent pairs (for example, the pair ($P_{11}$, $P_{12}$) and the pair ($P_{13}$, $P_{14}$), the pair ($P_{13}$, $P_{14}$) and the pair $P_{15}$, $P_{16}$), ... is obtained; and only when this difference exceeds a predetermined threshold value, the two picture elements making up the pair are regarded as changed ones and their level information is transmitted. In this case, noise components superimposed on the picture signal are averaged in the process of obtaining the sum (or mean value) of the two picture elements of each pair, there is possibility in that the number of the picture elements which are regarded as changed ones due to the noise components is reduced thus providing for the equivalently enhanced transmission efficiency.

By the way, in any one of the above principles, if the number of changed picture elements in one picture element group is in excess of $n_1 = \alpha_1 \cdot n_0$ or $\alpha_2 \cdot n_0$, the shutout occurs to deteriorate the picture quality. To avoid this, for example, by dispersing in the picture the picture elements to be shut out by preferentially transmitting the level information of the picture elements of large difference to shut out the picture elements of small difference, the deterioration of picture quality due to the shutout is made unnoticiable on the picture. If the number of changed picture elements exceeds $n_1$, it is also possible to use a principle of decreasing the number of the coded bits of the level information of some picture elements to reduce or eliminate the shutout. For example, if the number of usual coded bits is four, and if the number of the changed picture elements is larger than $n_1$ by one, only the level information of three changed elements is coded into three bits, by which all the information of ($n_1 + 1$)'s changed picture elements can be transmitted. This principle is very effective for the improvement of the picture quality, because the shutout is removed although a quantizing error a little increases in the portion in a case where the number of the coded bits has been reduced. In this case, if the number of the changed picture elements indicated by the change information group 3 (FIG. 2) is known, the number of the picture elements having the number of reduced coded bits can easily be obtained. Accordingly, if the order of the picture elements whose coded bit number is reduced is predetermined, there is no need of transmitting the information indicating the change in the number of the coded bits.

While the foregoing examples of this invention have been described in connection with the case of utilizing the difference characteristic of the picture signal, this invention is also possible of utilizing a forecast error characteristic of the picture signal. The difference can also be regarded as an error from a zero forecast value but this is a principle such that a higher forecast is effected and, only in connection with those picture elements whose errors from their forecast values exceed a predetermined level (these picture elements corresponding to the varying picture elements, in this case), their level information or the value of their errors are transmitted.

Refer to J. B. Millard and H. I. Maunsell "Digital Encoding of a Video Signal" B.S.T.J. Vol. 50, No. 2, February, 1971). In this case, the aforementioned various principles can be applied for dividing the picture into picture element groups transmitting of the error information and so on. As to the construction of the apparatus, forecasting circuits from adjacent picture element information are required in the transmitting and receiving sections respectively, but the other constructions are substantially identical with the aforementioned ones, so that no description will be repeated. In this principle, the ratio of the number of the varying picture elements to the number of all the picture elements can be reduced by using an effective forecasting principle as compared with that in the foregoing examples utilizing the difference, so that further band compression is possible.

Further, this invention is also applicable to the case of transmitting the picture signal after subjecting it to such an orthogonal conversion as an Hadamard conversion. This transmitting principle employing the orthogonal conversion is a system in which, for example, the level information $x_1, x_2, \ldots, x_8$ of eight picture elements $P_{f,g+1}, P_{f,g+2}, \ldots P_{f,g+8}$ aligned on a horizontal scanning line are subjected to the following orthogonal conversion:

$$\begin{bmatrix} y_1 \\ y_2 \\ \vdots \\ y_8 \end{bmatrix} = H \begin{bmatrix} x_1 \\ x_2 \\ \vdots \\ x_8 \end{bmatrix}$$

by using the following orthogonal conversion matrix:

$$H = \begin{bmatrix} h_{11}, & h_{12} & , \cdots & h_{18} \\ h_{21}, & h_{22} & , \cdots & h_{28} \\ \vdots & \vdots & & \vdots \\ h_{81}, & h_{82} & , \cdots & h_{88} \end{bmatrix}$$

and the resulting conversion level information groups $y_1, y_2, \ldots y_8$ are transmitted after coded into an appropriate number of bits respectively. With the application of the present invention to this method, it is possible to employ a method such that the conversion level information groups $y'_1, y'_2, \ldots, y'_8$ obtained by the orthogonal conversion of the level information of the eight picture elements $P_{f+1,g+1}, P_{f+1, g+2}, \ldots P_{f+1,g+8}$ on a subsequent horizontal scanning line are compared with the aforementioned $y_1, y_2, \ldots, y_8$ respectiely, and only those conversion level information of $y'_1, y'_2, \ldots y'_8$ whose difference exceeds a predetermined level are transmitted. In the method described previously, the level information of each picture element is processed but, in this method, only the conversion level information is processed, so that the principle described previously in connection with FIGS. 2 and 3 can be applied to the transmission of the changed conversion level information. Further, the apparatus construction is also substantially identical with the above one except the additional provision of an orthogonal conversion circuit. The orthogonal conversion transmission method is capable of band compression by itself, so that considerable band compression can be expected by the application of this invention.

As has been described in detail in the foregoing, in this invention, only the information (level or forecast error) of those changed picture elements whose error (the difference is considered as an error from a zero forecast value) with respect to a forecast value from a preceding adjacent picture element exceeds a discrimination level of an observer is transmitted by making effective use of the statistic properties of the picture signal. Hence, this invention enables very large band compression, coupled with the method of indicating the position of the changed picture element with change information of less than one bit per one picture element. For example, if all the picture elements of one frame of a television signal are regarded as one picture element group, and if the changed picture element ratio $\alpha_2 = 0.25$, if the number of error level coded bits of the varying picture element is four, and if the number of the change information bits per one picture element is one-half, it follows that $0.25 \times 4 + 1/2\ i.j = 1.5\ i.j$ bits for the transmission of the picture of one frame. (See FIG. 2. However, the portion of the unit synchronizing code 2 is slight, and hence is omitted.) Accordingly, in the cases of 6-bit PCM coding and 4-bit coding according to the conventional system, $(6.i.j)$'s bits and $(4.i.j)$'s bits are required respectively. Consequently, it will be seen that, with this invention, the required transmission band width can be reduced down to one-fourth to three-eighths, as compared with the conventional system under practically no deterioration of picture quality. Further, high order forecasting means such as first order forecasting, second order forecasting and so on can be used as the forecasting method.

Accordingly, this invention is an extremely effective system as a highly efficient picture phone signal transmission system which requires a very large band width and is expected of a rapid increase of channels in the near future. The present system is of particular utility when employed in international picture communication employing expensive communication circuits.

What we claim is:

1. In a picture signal transmission system having a transmission medium for transmitting therethrough after coding a picture signal obtained by scanning at least one picture to be transmitted, and
    detection means provided for detecting a difference between a representative level value of each picture element unit formed by one picture element and a forecast value, obtained in accordance with a predetermined rule and based on a representative level value of adjacent ones of said picture element units; the improvement comprising: transmission means connected to the detection means and said transmission medium for transmitting first level information and second level information to said transmission medium, said first level information indicating for each picture element by a bit of binary information, whether or not the said difference exceeds a predetermined threshold value for a group of picture elements corrresponding to a predetermined area of the picture, said second level information indicating level information of particular picture elements on each side of which said difference exceeds the threshold value.

2. A picture signal transmission system according to claim 1, in which said second level information is representative of the levels of said particular picture elements.

3. A picture signal transmission system according to claim 1, in which said second level information is representative of difference each between the level of said particular picture element and said forecast value.

4. A picture signal transmission system according to claim 1, in which said group of picture elements comprises all the picture elements on one of horizontal scanning lines of said scanning.

5. A picture signal transmission system according to claim 1, in which said group of picture elements comprises all the picture elements on one of vertical scanning lines of said scanning.

6. A picture signal transmission system, comprising:
    first input terminal means for receiving a picture signal obtained by scanning a picture to be transmitted;
    second input terminal means for receiving timing pulses each indicating the start timing of said scanning of said picture;
    address counter means operatively coupled to said second input terminal means for successively assuming addresses of picture elements of said picture signal in response to said timing pulses;
    reference value memory means operatively coupled to said first input terminal means and said address counter for successively storing level information of an immediately prior one of said picture elements scanned;
    comparator means operatively coupled to said first input terminal means and said reference value memory means for comparing the level information of an instant picture element in said picture signal with said stored level information of prior stored picture elements of the picture being scanned to produce change information indicating whether or not the instant picture element changes against said stored level information;
    change information memory means operatively coupled to said comparator means and said address counter means for successively storing said change information of the picture elements;
    code generator means operatively coupled to said address counter means for generating a first signal train including start code units and synchronizing code units;
    level information memory means operatively coupled to said first input terminal means, said address counter means and said comparator means for successively storing level information of changed picture elements;
    combiner means operatively coupled to said address counter means, said code generator means, said change information memory means and said level information memory means for combining outputs of said code generator, said change information memory means and said level information memory means to produce an output signal train; and output terminal means operatively coupled to said combiner means for applying said output signal train to transmission medium.

7. A picture signal transmission system according to claim 6, further including difference code means provided between said first input terminal means and said level information memory means and connected to said reference value memory means for coding said change information.

* * * * *